(12) United States Patent
Miki

(10) Patent No.: US 9,983,310 B2
(45) Date of Patent: May 29, 2018

(54) POSITION MEASUREMENT APPARATUS

(71) Applicant: MITUTOYO CORPORATION, Kawasaki, Kanagawa (JP)

(72) Inventor: Yutaka Miki, Tokyo (JP)

(73) Assignee: MITUTOYO CORPORATION, Kawasaki (JP)

( * ) Notice: Subject to any disclaimer, the term of this patent is extended or adjusted under 35 U.S.C. 154(b) by 251 days.

(21) Appl. No.: 14/834,981

(22) Filed: Aug. 25, 2015

(65) Prior Publication Data
US 2016/0061953 A1 Mar. 3, 2016

(30) Foreign Application Priority Data

Sep. 2, 2014 (JP) .................................. 2014-178283

(51) Int. Cl.
*G01C 3/08* (2006.01)
*G01S 17/48* (2006.01)
*G01S 7/481* (2006.01)

(52) U.S. Cl.
CPC ............ *G01S 17/48* (2013.01); *G01S 7/4813* (2013.01); *G01S 7/4818* (2013.01)

(58) Field of Classification Search
CPC ....... G01S 17/48; G01S 7/4813; G01S 7/4818
See application file for complete search history.

(56) References Cited

U.S. PATENT DOCUMENTS

2008/0069505 A1* 3/2008 Reichel ..................... G02B 6/08
385/120

FOREIGN PATENT DOCUMENTS

JP 2002-139311 A 5/2002

* cited by examiner

*Primary Examiner* — Samantha K Abraham
(74) *Attorney, Agent, or Firm* — Oliff PLC

(57) ABSTRACT

A position measurement apparatus includes a measurement head, a controller and a light transmission section. The measurement head includes a light projecting lens and a light receiving lens. The controller includes a light emitting section, a light emission circuit controlling the light emitting section, a light receiving section, and a pixel data processing circuit detecting a position of light received in the light receiving section, and outputting positional information to a calculation section calculating a position of an object to be measured. The light transmission section includes an optical fiber transmitting light from the light emitting section to the light projecting lens, and an image fiber with incidence and emission end faces, in which end faces of plural cores are two-dimensionally arrayed in the incidence end face and the emission end face, the image fiber transmitting light converged by the light receiving lens to the light receiving section.

4 Claims, 4 Drawing Sheets

POSITION MEASUREMENT APPARATUS

CROSS-REFERENCE TO RELATED APPLICATION

This non-provisional application claims priority under 35 U.S.C. § 119 (a) from Japanese Patent Application No. 2014-178283, filed on Sep. 2, 2014, the entire contents of which are incorporated herein by reference.

BACKGROUND

Technical Field

The present invention relates to a position measurement apparatus that obtains a position by receiving reflected light and scattered light of laser light irradiated onto a surface of an object to be measured.

Conventionally, a position measurement apparatus has been known, which irradiates a surface of an object to be measured with laser light, receives reflected light and scattered light thereof by an image sensor, and calculates a position of the surface of the object to be measured according to a triangulation method (for example, see JP-A 2002-139311).

FIG. 4 is a schematic view exemplifying a non-contact type position measurement apparatus using the triangulation method.

As illustrated in FIG. 4, this position measurement apparatus includes a measurement head 10 and a controller 20. A light source 21 that releases a laser light LS1 toward a work W, which is an object to be measured, and an image sensor 25, which is provided on an optical axis non-parallel to an optical axis of the laser light LS1, are provided inside the measurement head 10. In addition, a light projecting lens 11 that causes the laser light LS1 emitted from the light source 21 to be converged, and a light receiving lens 12 that causes the laser light reflected or scattered by the work W to be imaged in the image sensor 25 are provided in the measurement head 10. An arrangement and an angle of each of the light projecting lens 11, the light receiving lens 12 and the image sensor 25 are determined according to the shine-proof law. Further, a light emission circuit 22, an image data processing circuit 26 and a calculation section 27 are provided in the measurement head 10. These members are implemented on an electronic substrate (not illustrated).

When a position of the work W is measured by this position measurement apparatus, the measurement head 10 is directed to the work W, and the laser light LS1 is emitted from the light source 21 toward the work W. Further, reflected light and scattered light, by the work W, of the laser light LS1 are taken by the image sensor 25. Since a parallax D is provided between the light source 21 and the image sensor 25 in the position measurement apparatus, it is possible to obtain a displacement L of the work W using the triangulation method based on a positional information Δx which is taken by the image sensor 25, a focal length f and the parallax D.

SUMMARY OF THE INVENTION

However, in the conventional position measurement apparatus, an electronic substrate, in which a light emitting section, a light receiving section and various circuits are implemented, is incorporated in the measurement head, and thus, these members serve as a heat source and cause deterioration in temperature stability of measurement. For example, heat released from a laser light source used as the light emitting section, and heat, released from a processing circuit and a central processing unit (CPU) that process massive image data, is accumulated inside a housing of the measurement head. Further, thermal equilibrium temperature of the measurement head or time until thermal equilibrium arrives is different depending on a difference in heat dissipation conditions at the time of fixing the measurement head, which changes a degree of influence caused by thermal expansion of the measurement head.

Here, in some cases, a forced air cooling fan is attached to the measurement head in order to mitigate the influence caused by the heat generation of the electronic substrate. However, it is not possible to provide the measurement head in a sealed structure in order to obtain such an effect due to such a cooling mechanism, and deterioration in dust-proofness and drip-proofness is introduced. What is worse, it is not possible to use the position measurement apparatus in a vacuum without air for heat dissipation.

Further, in the circuit implemented to the electronic substrate, a high frequency is easily generated in order to process the massive image data at high speed, and thus, it is necessary to provide a shield using a cover. However, it is necessary to provide an opening to an emission part of light and a light receiving part in the housing of the measurement head. Thus, entrance and exit of an electromagnetic noise through the opening portion occur so that it is hard to reliably prevent influence caused by the external electromagnetic noise or to sufficiently suppress radiation of the electromagnetic noise.

An object of the present invention is to provide a position measurement apparatus capable of implementing a small and light measurement head, and further, suppressing influence of electromagnetic noise and measuring a position of an object to be measured with high accuracy.

In order to solve the problems described above, a position measurement apparatus of the present invention is provided with: a measurement head; a controller provided being separated apart from the measurement head; and a light transmission section provided between the measurement head and the controller. The measurement head includes a light projecting lens that causes light toward an object to be measured to be converged, and a light receiving lens that causes light from the object to be measured toward the measurement head to be converged. The controller includes a light emitting section, a light emission circuit that controls the light emitting section, a light receiving section, and a pixel data processing circuit that detects a position of light received in the light receiving section, and outputs positional information to a calculation section that calculates the position of the object to be measured. The light transmission section includes an optical fiber that transmits light emitted from the light emitting section to the light projecting lens, and an image fiber with an incidence end face and an emission end face, in which end faces of a plurality of cores are two-dimensionally arrayed in the incidence end face and the emission end face, the image fiber that transmits light converged by the light receiving lens to the light receiving section.

According to such a configuration, members serving as a heat source such as the light emitting section, the light receiving section, the light emission circuit and the pixel data processing circuit are provided in the controller, that is, the members serving as the heat source is not provided in the measurement head. In addition, a circuit serving as a source of generating the electromagnetic noise is provided in the controller, and is not provided in the measurement head.

Therefore, there is no need to provide the shield configured to suppress the electromagnetic noise in the measurement head. On the other hand, it is possible to reliably provide the shield on the controller side.

In the position measurement apparatus of the present invention, the calculation section may be provided in the controller. According to such a configuration, it is possible to obtain the position of the object to be measured in the controller, and the reduction in size of the entire apparatus is achieved.

In the position measurement apparatus of the present invention, the controller may have an imaging lens. The imaging lens is provided between the image fiber and the light receiving section, and causes the light from the image fiber toward the light receiving section to be imaged on the light receiving section. According to such a configuration, it is possible to perform the measurement of the position with high accuracy by reliably imaging the light emitted from the image fiber on the light receiving section.

The position measurement apparatus of the present invention may be configured such that light is incident to a different position on the incidence end face depending on a distance on an optical axis between the light projecting lens and the object to be measured in the incidence end face, and light is emitted from an emission position of the emission end face corresponding to the incidence position of the light on the incidence end face. According to such a configuration, it is possible to reliably transmit information of a condensing position of the light receiving lens, which varies depending on the distance between the light projecting lens and the object to be measured, to the light receiving section by the image fiber.

DETAILED DESCRIPTION OF THE EMBODIMENTS

Hereinafter, an embodiment of the present invention will be described with reference to the drawings. Incidentally, in the following description, the same reference symbols are assigned to the same parts, and descriptions regarding parts described once will not be repeated, as appropriate.

First Embodiment

Figure 1A:
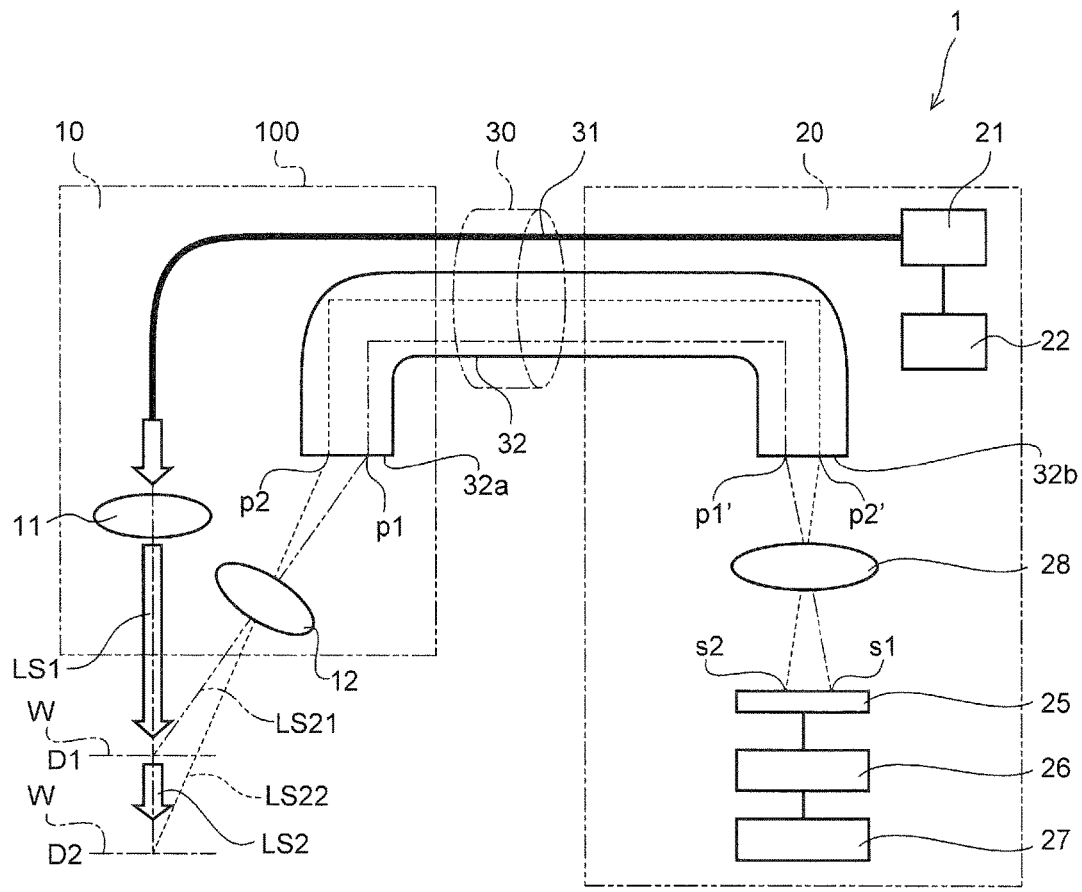
FIG. 1A is a configuration diagram of a position measurement apparatus according to a first embodiment.
Figure 1B:
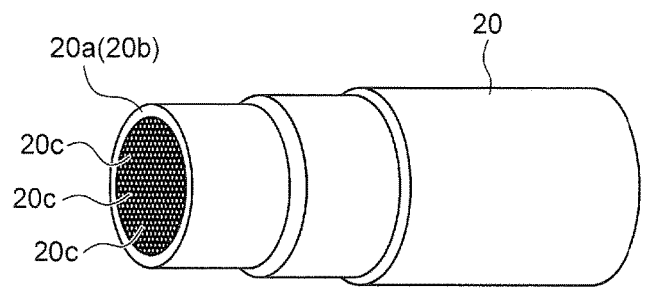
FIG. 1B is a configuration diagram of an image fiber.

FIGS. 1A and 1B are diagrams exemplifying a position measurement apparatus according to a first embodiment. FIG. 1A illustrates a configuration diagram of a position measurement apparatus 1 according to the first embodiment. FIG. 1B illustrates a configuration diagram of an image fiber 32.

As illustrated in FIG. 1A, the position measurement apparatus 1 according to the present embodiment includes a measurement head 10, a controller 20 and a light transmission section 30. The position measurement apparatus 1 is an apparatus that irradiates a work W, which is an object to be measured with light, from the measurement head 10, receives reflected light and scattered light of the light by the measurement head 10, and measures a distance from the measurement head 10 to the work W based on a triangulation method in a non-contact manner.

The measurement head 10 has a light projecting lens 11 that causes a laser light LS1 toward the work W to be converged, and a light receiving lens 12 that causes the reflected light and scattered light (hereinafter, these will referred to as "detected light") to be converged, which are emitted from the work W toward the measurement head 10. The light projecting lens 11 and the light receiving lens 12 are arranged inside a housing 100 of the measurement head 10. An optical axis of the light receiving lens 12 is non-parallel to an optical axis of the light projecting lens 11.

The controller 20 is provided being spaced apart from the measurement head 10. The controller 20 is provided with a light source 21 serving as a light emitting section, a light emission circuit 22, an image sensor 25 serving as a light receiving section, and an image data processing circuit 26. In addition, the controller 20 may be provided with a calculation section 27.

For example, a laser light source is used as the light source 21. The light source 21 is controlled by the light emission circuit 22. The light emission circuit 22 performs a control of supplying current to the light source 21 using a power supply (not illustrated). In this manner, the laser light LS1 is emitted from the light source 21. In the present embodiment, the laser light LS1 emitted from the light source 21 is transmitted to the measurement head 10 by an optical fiber 31 to be described below.

A charge coupled device (CCD), a complementary metal-oxide semiconductor (CMOS) or the like is used as the image sensor 25. The image sensor 25 outputs a signal depending on intensity of the received light. The image data processing circuit 26 processes the signal output from the image sensor 25, and outputs a position of a pixel of which the amount of the received light is at the peak in the image sensor 25 as positional information. In the present embodiment, the detected light transmitted from the measurement head 10 to the controller 20 by the image fiber 32 to be described below is received by the image sensor 25.

The positional information output from the image data processing circuit 26 is sent to the calculation section 27. In the calculation section 27, a distance between the measurement head 10 and the work W is obtained from the positional information by calculation based on the triangulation method. Incidentally, the calculation section 27 may be provided in a computer (not illustrated) other than the controller 20. In addition, the calculation section 27 may be configured by programs to be executed by the computer.

The light transmission section 30 has the optical fiber 31 and the image fiber 32. The optical fiber 31 and the image fiber 32 are bundled together, and provided between the measurement head 10 and the controller 20.

The optical fiber 31 has a single core, for example. The optical fiber 31 transmits the laser light LS1 emitted from the light source 21 to the light projecting lens 11 of the measurement head 10. In this manner, the laser light LS1 emitted from the light source 21 is sent from the controller 20 to the measurement head 10 via the optical fiber 31, and is irradiated onto a surface of the work W by the light projecting lens 11.

The image fiber 32 is an optical transmission path that transmits the detected light converged on the light receiving lens 12 of the measurement head 10 to the image sensor 25 of the controller 20. The image fiber 32 has an incidence end face 32a and an emission end face 32b. The incidence end face 32a side of the image fiber 32 is inserted into the measurement head 10, and the emission end face 32b side of the image fiber 32 is inserted into the controller 20. An arrangement and an angle of each of the light projecting lens 11, the light receiving lens 12 and the incidence end face 32a are determined according to the shine-proof law.

FIG. 1B illustrates a configurational example of the image fiber 32. For convenience of description, FIG. 1B illustrates only one end face (for example, the incidence end face 32a) of the image fiber 32, but the other end face (for example, the emission end face 32b) is formed likewise.

End faces of a plurality of cores 32c are two-dimensionally arrayed (for example, in a hexagonal close-packed array) in the incidence end face 32a of the image fiber 32. A diameter of the core 32c is about from 3 μm to 5 μm. The number of the plurality of cores 32c is about from 3,000 to 30,000. The entire diameter of the plurality of cores 32c bundled is about from 0.4 mm to 8 mm.

The array of the end faces of the plurality of cores 32c is maintained from the incidence end face 32a to the emission end face 32b. In this manner, the image fiber 32 can transmit a two-dimensional image incident from the incidence end face 32a to the emission end face 32b while maintaining a shape thereof.

An imaging lens 28 may be provided between the emission end face 32b of the image fiber 32 and the image sensor 25 inside the controller 20. It is possible to reliably image the detected light emitted from the emission end face 32b of the image fiber 32 on a light receiving face of the image sensor 25 by providing the imaging lens 28.

In order that the position of the work W is measured using the position measurement apparatus 1 according to the present embodiment, first, the laser light LS1 is emitted from the light source 21, and is sent to the measurement head 10 by the optical fiber 31, and then is irradiated onto the surface (measurement point) of the work W by the light projecting lens 11.

Next, the detected light of the laser light LS1 irradiated onto the surface of the work W is received by the incidence end face 32 of the image fiber 32 via the light receiving lens 12, and is transmitted to the controller 20. At this time, for example, in a case where the work W is arranged in a first position D1, a first detected light LS21 of the laser light LS1 is imaged at a position p1 of the incidence end face 32a of the image fiber 32 by the light receiving lens 12. In addition, in a case where the work W is arranged in a second position D2, a second detected light LS22 of the laser light LS1 is imaged at a position p2 of the incidence end face 32a of the image fiber 32 by the light receiving lens 12. That is, imaging positions on the incidence end face 32a of the first detected light LS21 and the second detected light LS22 vary depending on the position of the work W (the distance between the measurement head 10 and the work W).

The image fiber 32 transmits the detected light incident from the incidence end face 32a to the controller 20. The first detected light LS21 incident from the position p1 of the incidence end face 32a is transmitted through the image fiber 32 and is emitted from a position p1' of the emission end face 32b. In addition, the second detected light LS22 incident from the position p2 of the incidence end face 32a is transmitted through the image fiber 32 and is emitted from position p2' of the emission end face 32b.

Here, the position p1' of the first detected light LS21 emitted from the emission end face 32b corresponds to the position p1 of the incidence end face 32a, and the position p2' of the second detected light LS22 corresponds to the position p2 of the incidence end face 32a. Incidentally, an arrangement relationship of images on the incidence end face 32a and the emission end face 32b is horizontally reversed.

Next, the detected light emitted from the emission end face 32b of the image fiber 32 is taken by the image sensor 25 via the imaging lens 28. The first detected light LS21 emitted from the position p1' of the emission end face 32b is detected around a pixel at a position s1 of the image sensor 25. In addition, the second detected light LS22 emitted from the position p2' of the emission end face 32b is detected around a pixel at a position s2 of the image sensor 25.

Next, the signal detected in the image sensor 25 is processed by the image data processing circuit 26, and the positional information of the pixel of which the intensity of the received light is at the peak is obtained. This positional information is sent to the calculation section 27, and the position of the work W is obtained based on the triangulation method by the calculation section 27.

Figure 2A:
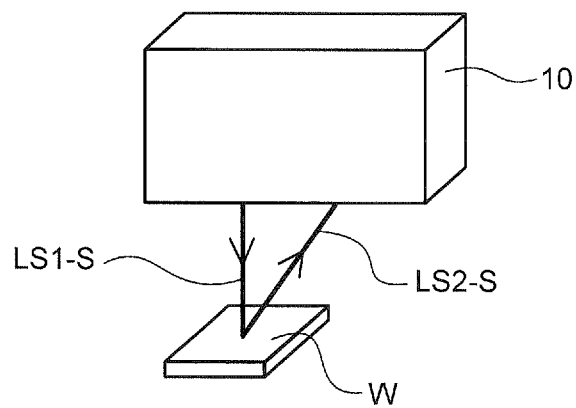
FIG. 2A is a schematic view illustrating an example of a displacement measurement using a triangulation method.
Figure 2B:
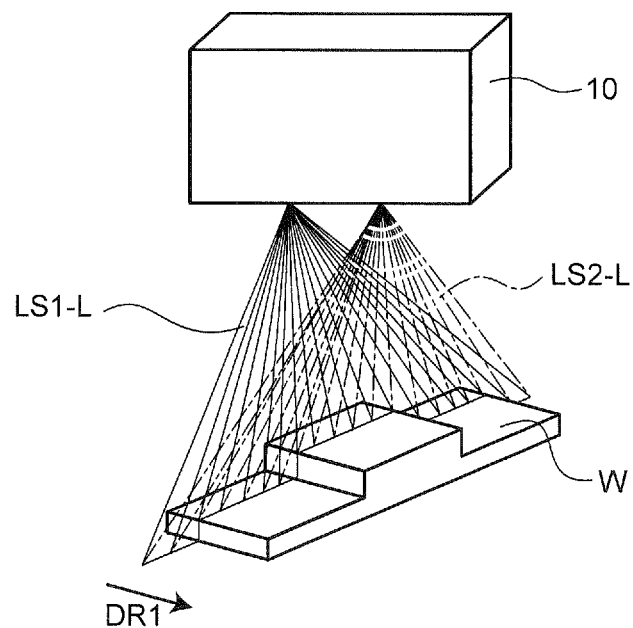
FIG. 2B is a schematic view illustrating an example of a two-dimensional outline measurement.

FIGS. 2A and 2B are schematic views illustrating examples of a position measurement. FIG. 2A illustrates an example of a displacement measurement using the triangulation method. FIG. 2B illustrates an example of a two-dimensional outline measurement. In the displacement measurement illustrated in FIG. 2A, the work W is irradiated with a spot light LS1-S from the measurement head 10. When a detected light LS2-S of the spot light LS1-S irradiated onto the surface of the work W is condensed by the light receiving lens 12, the condensing position thereof varies depending on a height (the distance between the measurement head 10 and the work W). It is possible to obtain the height of the work W using the triangulation method by taking such displacement in the image sensor 25.

In the two-dimensional outline measurement illustrated in FIG. 2B, the work W is irradiated with a line light LS1-L from the measurement head 10. When a detected light LS2-L of the line light LS1-L irradiated onto the surface of the work W is condensed by the light receiving lens 12, the condensing position thereof varies depending on a height of an outline of the work W which is irradiated with the line light LS1-L. It is possible to obtain the height of the outline, that is, the cross-sectional shape of the work W using the triangulation method by taking such displacement in the image sensor 25. Further, when the height of the outline of the work W is measured by moving a relative position of the work W and the line light LS1-L in a direction DR1 perpendicular to a line direction of the line light, it is possible to measure a shape of the outline of the work W.

In the position measurement apparatus 1 according to the present embodiment provided with such a configuration, members such as the light source 21, the light emission circuit 22, the image sensor 25 and the image data processing circuit 26 are provided in the controller 20, and are not provided in the measurement head 10, and thus, the measurement head 10 is reduced in size and weight.

In addition, since members serving as a heat source such as the light source 21, the light emission circuit 22, the image sensor 25 and the image data processing circuit 26 are not provided in the measurement head 10, it is possible to reduce influence caused by heat of the measurement head 10. Here, although the members serving as the heat source are provided in the controller 20, it is possible to allow a housing capacity in the controller 20 as compared to the measurement head 10 so that it is easy to provide a cooling mechanism therein. Therefore, it is possible to reduce the influence caused by heat as compared to a case where the members serving as the heat source are provided in the measurement head 10.

In the present embodiment, only a part of the light projecting lens 11, the light receiving lens 12 and the light transmission section 30 are housed in the housing 100 of the measurement head 10. Since it is not necessary to provide the cooling mechanism in the measurement head 10, it is easy to provide the housing 100 in a sealed structure. Thus, it is possible to increase dust-proofness and drip-proofness of the measurement head 10.

In addition, since there is no need to provide the image data processing circuit 26 generating a high frequency in the measurement head 10, it is not necessary to provide a shield to suppress an electromagnetic noise in the measurement head 10. Since there is no need to provide the shield, it is not necessary to use metal as a main material of the housing 100 of the measurement head 10, and it is possible to configure the housing 100 using resin or the like. In this manner, the further reduction in weight of the measurement head 10 is achieved.

In addition, since the light source 21, the image sensor 25 and various circuits, which have a narrow usable temperature range, in the measurement head 10, it is possible to bring the measurement head 10 even in environment at a harsh temperature, for example, at a high temperature exceeding 100° C. or at a low temperature of equal to or lower than −50° C. and perform the measurement.

In the present embodiment, even if the measurement head 10 and the controller 20 are apart from each other, it is not necessary to provide a cable for transmitting the electrical signal therebetween. Therefore, a transmission loss due to the cable is not generated between the measurement head 10 and the controller 20. In addition, it is possible to shorten a transmission path of the electrical signal, and to achieve speeding up in data processing.

Application Example

Next, an application example of the present invention will be described.

Figure 3:
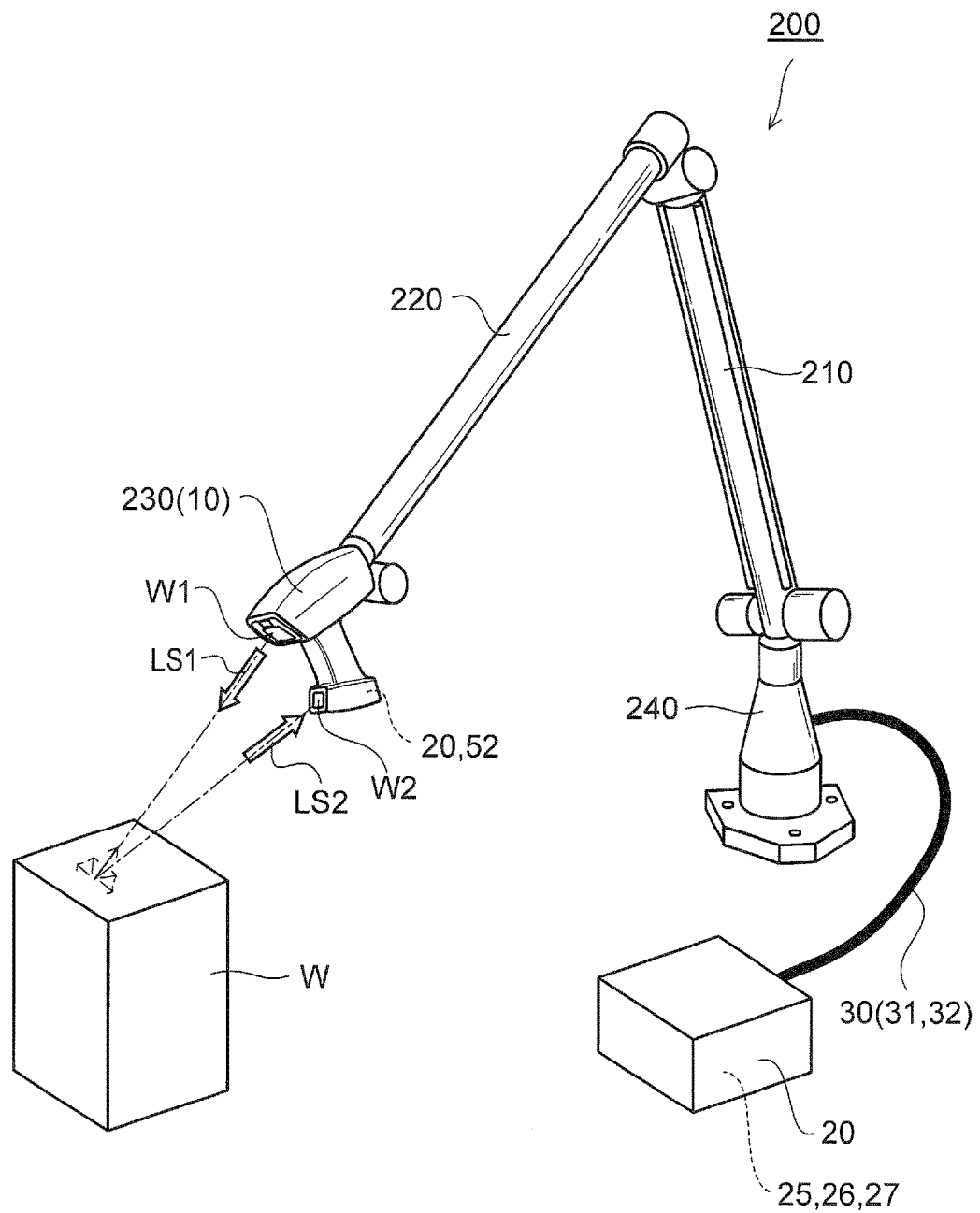
FIG. 3 is a schematic perspective view exemplifying an arm-type position measurement apparatus.
Figure 4:
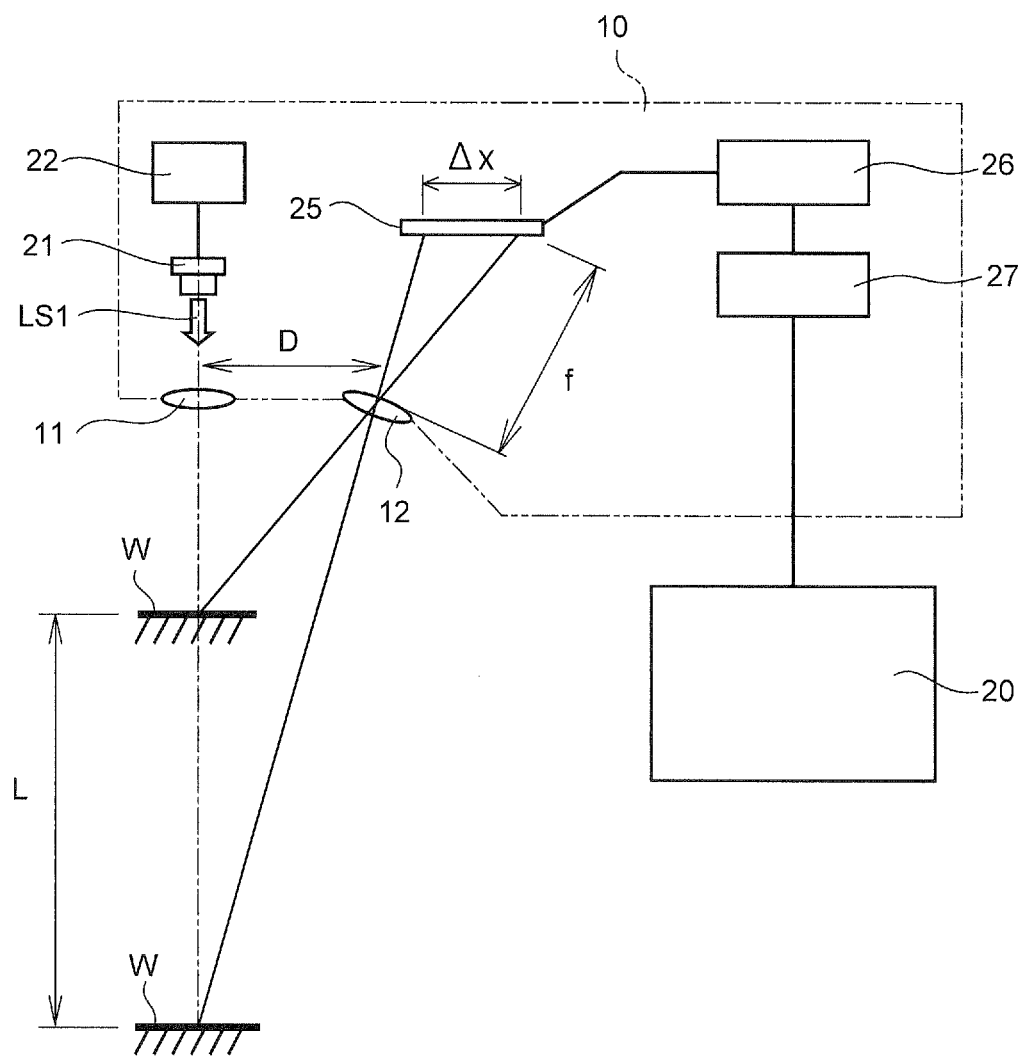
FIG. 4 is a schematic view exemplifying a non-contact type position measurement apparatus using the triangulation method.

FIG. 3 is a schematic perspective view exemplifying an arm-type position measurement apparatus.

As illustrated in FIG. 3, an arm-type position measurement apparatus 200 is a position measurement apparatus having a multi-axial structure. The arm-type position measurement apparatus 200 includes a first arm 210, a second arm 220, a laser probe 230, abase section 240 and the controller 20.

The base section 240 is fixed to a surface plate or the like (not illustrated). A lower end of the first arm 210 is attached to the base section 240. The first arm 210 is attached with respect to the base section 240 to be rotatable about two axes, for example.

A rear end of the second arm 220 is attached to a front end of the first arm 210. The second arm 220 is attached with respect to the first arm 210 to be rotatable about one axis. The laser probe 230 is attached to a front end of the second arm 220. The laser probe 230 is attached with respect to the second arm 220 to be rotatable about two axes, for example.

The laser probe 230 is the measurement head 10. The controller 20 is arranged at a position spaced apart from the laser probe 230. The light transmission section 30 is provided between the laser probe 230 and the controller 20. The light transmission section 30 is installed to pass from the laser probe 230, through the second arm 220, the first arm 210 and the base section 240, to the controller 20.

In the arm-type position measurement apparatus 200, the laser light LS1 is released from a first window W1 of the laser probe 230. The detected light from the work W is taken from a second window W2 of the laser probe 230, and further, is sent to the controller 20 via the image fiber 32 of the light transmission section 30.

The detected light sent to the controller 20 is converted into the electrical signal depending on the amount of light by the image sensor 25 provided in the controller 20. The image data processing circuit 26 obtains the positional information from the electrical signal, and further, calculates the position of the work W based on the triangulation method by the calculation section 27.

It is possible to achieve reduction in size and weight of the laser probe 230 by applying the position measurement apparatus 1 according to the present embodiment to such an arm-type position measurement apparatus 200. In the arm-type position measurement apparatus 200, a user performs measurement by moving the laser probe 230 to a predetermined position, and thus, the laser probe 230 is reduced in size and weight. Accordingly, it is possible to considerably reduce a load of the user.

As described above, according to the position measurement according to the embodiment, it is possible to provide the position measurement apparatus capable of implementing the small and light measurement head, and further, suppressing the influence of the electromagnetic noise and measuring the position of the object to be measured with high accuracy.

Incidentally, although the embodiment and the application example are described as above, the present invention is not limited to these examples. For example, anything obtained by appropriately performing addition, removal or design alteration of a component with respect to the embodiment and the application example described above by a person skilled in the art is included in the range of the present invention as long as containing a gist of the present invention.

INDUSTRIAL APPLICABILITY

As described above, the present invention can be preferably applied not only to the arm-type position measurement apparatus but also to an image measurement apparatus in which the measurement head 10 linearly moves along each of XYZ axes.

What is claimed is:
1. A position measurement apparatus comprising:
   a measurement head, the measurement head including:
      a light projecting lens that converges light travelling toward an object to be measured; and
      a light receiving lens that converges light travelling from the object to be measured toward the measurement head;
   a controller provided apart from the measurement head, the controller including:
      a light emitter;
      a light emission circuit that controls the light emitter;
      a light receiver; and
      a pixel data processing circuit that detects a position of light received in the light receiver, and outputs positional information to a calculator that calculates a position of the object to be measured; and
   a light transmitter provided between the measurement head and the controller, the light transmitter including:

an optical fiber that transmits light emitted from the light emitter to the light projecting lens; and an image fiber with an incidence end face and an emission end face, in which end faces of a plurality of cores are two-dimensionally arrayed in the incidence end face and the emission end face, the image fiber transmitting light converged by the light receiving lens to the light receiver.

2. The position measurement apparatus according to claim 1, wherein the calculator is provided in the controller.

3. The position measurement apparatus according to claim 1, wherein the controller has an imaging lens that is provided between the image fiber and the light receiver, and causes light, travelling toward the light receiver from the image fiber, to be imaged on the light receiver.

4. The position measurement apparatus according to claim 1, wherein in the incidence end face, light is incident to a different position on the incidence end face depending on a distance on an optical axis between the light projecting lens and the object to be measured, and in the emission end face, the light is emitted from an emitting position corresponding to an incident position of the light on the incidence end face.

* * * * *